United States Patent Office 3,752,818
Patented Aug. 14, 1973

3,752,818
SULPHONYL-UREAS AND SULPHONYL-SEMICAR-
BAZIDES CONTAINING HETEROCYCLIC ACYL
AMINO GROUPS AND THEIR PRODUCTION
Hans Plumpe and Walter Puls, Wuppertal-Elberfeld,
Germany, assignors to Bayer Aktiengesellschaft, Lever-
kusen, Germany
No Drawing. Filed Apr. 27, 1970, Ser. No. 32,465
Claims priority, application Germany, Apr. 29, 1969,
P 19 21 737.9
Int. Cl. C07d 33/60
U.S. Cl. 260—287R
9 Claims

ABSTRACT OF THE DISCLOSURE

Sulphonyl-ureas and sulphonyl-semicarbazides of the formula:

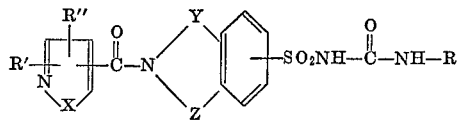

wherein
R is straight or branched chain saturated or unsaturated aliphatic of up to 10 carbon atoms, mono- or polycyclic cycloaliphatic and the corresponding ring systems wherein the carbon atom in the ring system of R at the point of linkage to the adjacent NH-group is replaced by a nitrogen atom, cycloalkylalkyl substituted by lower alkyl or polycycloalkylalkyl substituted by lower alkyl,
R' and R'' are hydrogen, halogen, alkyl, phenyl, mono- or di-halophenyl or lower alkoxyphenyl, or R' and R'' are alkyl linked together;
X is oxygen, sulphur, nitrogen or nitrogen whose hydrogen atom is replaced by alkyl, aryl, aralkyl or by alkyl, aryl or aralkyl substituted by halogen, alkyl, alkoxy or trifluoromethyl, and
Y and Z are unsubstituted or alkyl-substituted alkylene of 1 to 3 carbon atoms, or if Y or Z is at least 2 carbon atoms, the other one may be a direct bond, and pharmaceutically acceptable non-toxic salts thereof, exhibit blood sugar depressant properties and are thus useful agents in the treatment of diabetes. These compounds may be produced by the reaction of amino compounds with sulphonamide derivatives or arylsulphonyl isocyanates or by reacting sulphonamides with amine derivatives or isocyanate derivatives.

The present invention is concerned with sulphonyl-ureas and sulphonyl-semicarbazides.

It is known that derivatives of aryl-sulphonyl-ureas have a blood sugar depressant effect. In particular, N-(4-methyl-benzene-sulphonyl)-N'-butyl - urea (tolbutamide) has achieved great importance as a therapeutic agent for the treatment of diabetes because of its blood sugar depressant activity and its good compatibility upon administration to humans.

According to the present invention, sulphonyl-ureas and sulphonyl semicarbazides which contain heterocyclic acylamino groups exhibit superior blood sugar depressant activity than tolbutamide and exhibit good compatibility upon administration to humans. These compounds may be represented by the formula:

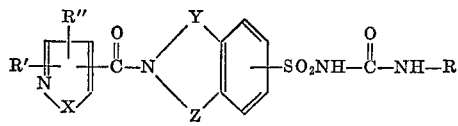

wherein
R is straight or branched chain saturated or unsaturated alkyl of up to 10 carbon atoms, i.e. alkyl of 1 to 10 carbon atoms, alkenyl of 2 to 10 carbon atoms or alkynyl of 2 to 10 carbon atoms, a member selected from the group consisting of cycloalkyl, bicycloalkyl, tricycloalkyl, tetracycloalkyl, cycloalkyl substituted by alkyl of 1 to 4 carbon atoms, bicycloalkyl substituted by alkyl of 1 to 4 carbon atoms, tricycloalkyl substituted by alkyl of 1 to 4 carbon atoms, tetracycloalkyl substituted by alkyl of 1 to 4 carbon atoms and the corresponding ring systems wherein the carbon atom in the ring system of R at the point of linkage to the adjacent NH—group is replaced by a nitrogen atom, cycloalkylalkyl substituted by lower alkyl or polycycloalkylalkyl substituted by lower alkyl,
R' and R'' are hydrogen, halogen, alkyl, alkyl linked to one another (that is, R' and R'' may each be an alkyl group which alkyl groups are linked to one another), phenyl, mono- or di-halophenyl or lower alkoxyphenyl,
X is oxygen, sulphur, nitrogen or nitrogen whose hydrogen atom is substituted by alkyl, especially lower alkyl, aryl, aralkyl or alkyl, aryl or aralkyl substituted by a member selected from the group consisting of halogen, alkyl, especially lower alkyl, alkoxy, especially lower alkoxy and trifluoromethyl, and
Y and Z are alkylene of 1 to 3 carbon atoms, alkylene of 1 to 3 carbon atoms substituted by alkyl of 1 to 4 carbon atoms or if Y or Z consists of at least 2 carbon atoms, the other one is a direct bond, or pharmaceutically acceptable non-toxic salts thereof.

These compounds may be administered as such or in the form of their salts. The alkali metal salts and alkaline earth metal salts are particularly useful and valuable forms of the present invention. These compounds, including the salts, exhibit a strong blood sugar depressant effect which is superior to that exhibited by tolbutamide.

The compounds of the present invention may be administered by the same general routes and in the same general or lower dosage ranges as known blood sugar depressant compounds such as tolbutamide, although it should be clearly borne in mind that variations in dosage range such as a lowering of the dosage range may be indicated and that such considerations as the severity of the condition, the past and present medical history of the patient, etc. must be taken into consideration in determining the precise dosage range. The compounds of the present invention are particularly suitable for oral administration.

The compounds of the present invention may be prepared by procedures per se known. For example, amino compounds of the formula:

$$H_2N—R$$

wherein R is as defined above, can be reacted with sulphonamide derivatives containing heterocyclic acyl radicals which may be represented by the formula:

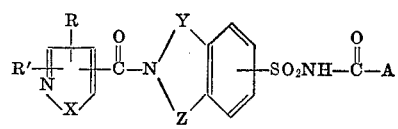

wherein R', R'', X, Y and Z are as above defined and A is a radical which during the course of the reaction is split off and combined with one of the hydrogen atoms of the amino compounds $H_2N—R$, thereby forming a compound HA, which is eliminated, or, said amino compound may be reacted with the corresponding arylsulphonyl-isocyanate of the formula:

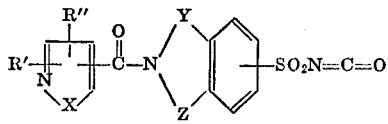

wherein R', R", X, Y and Z are as above defined.

Examples of A above include halogen, azido, alkoxy, aryloxy, alkylmercapto, arylmercapto, and optionally substituted amino, cyclic amino or acylamino groups.

It is also possible to produce the compounds of the present invention by reacting sulphonamides of the formula:

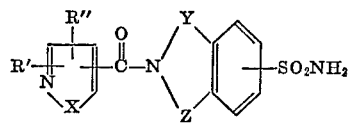

wherein R', R", X, Y and Z are as above defined, as such or in the form of their alkali or alkaline earth metal salts, with an amine derivative of the formula:

B—CO—NH—R or with a corresponding isocyanate derivative of the formula:

O=C=N—R in which R is as above defined, and B is a radical which during the course of the reaction reacts with a hydrogen atom of the sulphonamide group or with the alkali metal atom M of the corresponding sulphonamide alkali metal or earth metal salt which results in the elimination of a compound HB or MB.

B in this case may also be halogen, azido, alkoxy, aryloxy, alkylmercapto, arylmercapto or an optionally substituted amino, cycloamino or acylamino group.

Suitable carboxylic acids on which the heterocyclic acyl radical in the claimed compounds is based are, for example, isoxazole-5-carboxylic acid,
3-methyl-isoxazole-5-carboxylic acid,
5-methyl-isoxazole-3-carboxylic acid,
5-methyl-3-phenylisoxazole-4-carboxylic acid,
3-(2',6'-dichlorophenyl)-5-methylisoxazole-4-carboxylic acid,
3,5-dimethyl-isoxazole-4-carboxylic acid,
isoxazole-3-carboxylic acid,
isoxazole-4-carboxylic acid,
3-methyl-isoxazole-4-carboxylic acid,
5-methyl-isoxazole-4-carboxylic acid,
4,5-dimethyl-isoxazole-3-carboxylic acid,
5-hexyl-isoxazole-3-carboxylic acid,
5-octyl-isoxazole-3-carboxylic acid,
5-phenyl-isoxazole-3-carboxylic acid,
5-tert.-butyl-3-phenyl-isoxazole-4-carboxylic acid,
3,5-diphenyl-isoxazole-4-carboxylic acid,
3-ethyl-5-methyl-isoxazole-4-carboxylic acid,
5-methyl-3-phenyl-isoxazole-4-carboxylic acid,
4-chloro-3-methyl-isoxazole-5-carboxylic acid,
3-phenyl-isoxazole-5-carboxylic acid,
4-phenyl-isoxazole-5-carboxylic acid,
3,4-tetramethylene-isoxazole-5-carboxylic acid,
4,5-tetramethyleneisoxazole-5-carboxylic acid,
4,5-tetramethylene-isoxazole-3-carboxylic acid;
isothiazole-3-carboxylic acid,
4-phenyl-isothiazole-3-carboxylic acid,
5-phenyl-isothiazole-3-carboxylic acid,
isothiazole-4-carboxylic acid,
3-methyl-isothiazole-4-carboxylic acid,
3,5-dimethyl-isothiazole-4-carboxylic acid,
3-methyl-5-benzyl-isothiazole-4-carboxylic acid,
3-methyl-5-ethyl-isothiazole-4-carboxylic acid,
3-methyl-5-propyl-isothiazole-4-carboxylic acid,
3-ethyl-5-phenyl-isothiazole-4-carboxylic acid,
4-methyl-isothiazole-5-carboxylic acid,
3-chloro-5-methoxy-isothiazole-4-carboxylic acid,
3,5-dichloro-isothiazole-4-carboxylic acid,
pyrazole-3-carboxylic acid,
pyrazole-4-carboxylic acid,
1-methylpyrazole-5-carboxylic acid,
4-methyl-pyrazole-4-carboxylic acid,
3-methyl-pyrazole-4-carboxylic acid,
3-methyl-pyrazole-5-carboxylic acid,
1-phenyl-pyrazole-3-carboxylic acid,
1-phenylpyrazole-4-carboxylic acid,
1-phenyl-pyrazole-5-carboxylic acid,
4-phenyl-pyrazole-3-carboxylic acid,
3-phenyl-pyrazole-4-carboxylic acid,
3-phenyl-pyrazole-5-carboxylic acid,
3-methyl-1-phenyl-pyrazole-4-carboxylic acid,
5-methyl-1-phenyl-pyrazole-4-carboxylic acid,
5-methyl-1-phenyl-pyrazole-3-carboxylic acid,
3-methyl-1-phenyl-pyrazole-5-carboxylic acid,
1-methyl-5-phenyl-pyrazole-3-carboxylic acid,
1-methyl-5-phenyl-pyrazole-5-carboxylic acid,
4-methyl-3-phenyl-pyrazole-5-carboxylic acid,
3-methyl-5-phenyl-pyrazole-4-carboxylic acid,
1,4-dimethyl-pyrazole-3-carboxylic acid,
1,4-dimethyl-pyrazole-5-carboxylic acid,
1,5-dimethyl-pyrazole-3-carboxylic acid,
1,3-dimethyl-pyrazole-5-carboxylic acid,
1,4-dimethyl-pyrazole-5-carboxylic acid,
3,5-dimethyl-pyrazole-4-carboxylic acid,
4,5-dimethyl-pyrazole--carboxylic acid.

The part of the molecule

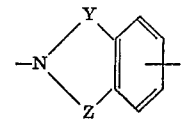

may be derived from the following compounds, for example:

indoline,
isoindoline,
1-ethyl-isoindole,
1,3-dimethyl-isoindole,
1,2,3,4-tetrahydro-quinoline,
1,2,3,4-tetrahydro-quinaldine
1,2,3,4-tetrahydro-isoquinoline,
1-methyl-1,2,3,4-tetrahydro-isoquinoline or
1H-2,3,4,5-tetrahydro-3-benzazepine.

Suitable amino compounds on which the group —NHR in the products of the present process is based are, for example:

Aliphatic, straight-chain or branched, saturated or unsaturated amines with up to 10 carbon atoms; cycloalkylamines such as cyclopentylamine, 2-methyl-cyclopentylamine, cyclohexylamine, 3-methyl-cyclohexylamine, 4,4-dimethyl-cyclohexylamine, cycloheptylamine, cyclooctylamine, bicyclo-[2,2,1]-heptyl-2-amine, nortricyclylamine, adamantylamine, adamantylmethylamine, 2-methylbicyclo-[2,2,1]-heptyl-2-methylamine, α-(bicyclo-[2,2,1]-heptyl - 2) - ethylamine, fenchylamine, bornylamine, cyclohexen-1-yl-ethylamine; furthermore, cyclic N-amino compounds such as 1-amino-pyrrolidine,
1-amino-piperidine,
1-amino-hexamethylene-imine,
3-amino-3-azabicyclo-[3,2,0]-heptane,
3-amino-3-azabicyclo-[3,2,1]-octane,
2-amino-2-azabicyclo-[2,2,2]-octane,
3-amino-3-azabicyclo-[3,3,1]nonane,
9-amino-9-azabicyclo-[3,3,1]-nonane, and their alkyl-substitution products.

Depending on the method of operation, the amines can be used as such or in the form of their derivatives such as carbamic acid chlorides, carbamic acid esters or carbamic acid azides.

The reactions according to the invention are carried out without or in suitable solvents or diluents; depending on the reactivity of the components, the reaction itself is exothermic or its progress must be brought about or furthered by applying elevated temperatures. The final products can, moreover, be converted into therapeutically useable salts.

The compounds of the present invention which may contain one or more optically active carbon atoms can be obtained not only in the form of their racemates, but also in the form of their optically active isomers. In the case of the optically active isomers, these can be produced either by using a suitable optically active starting material or by subjecting either the racemic intermediates or the racemic final products to resolution by techniques which are per se known.

The following non-limitative examples more particularly illustrate the present invention.

EXAMPLE 1

(a) 65.5 g. (0.345 mol) 3-acetyl-2,3,4,5-tetrahydro-1H-3-benzazepine (prepared from 2,3,4,5-tetrahydro-1H-benzazepine and acetic acid anhydride, B.P. 140–141° C./0.3 mm. Hg, M.P. 52–54°) are introduced portionwise into 150 ml. chlorosulphonic acid so that the temperature does not exceed 15° C. The mixture is stirred at room temperature for 30 minutes and at 80° C. for a further two hours, then poured on to ice and the precipitated crude sulphochloride is taken up with methylene chloride. After drying over calcium chloride, the solvent is drawn off. The remaining crude sulphochloride is dissolved in about the same volume of acetone, and the solution is added dropwise at 15–20° C. to 400 ml. of semi-concentrated aqueous ammonia. After stirring for several hours, the resultant precipitate is filtered off with suction, dissolved in a 2 N sodium hydroxide solution, the solution is filtered, and the reaction product again precipitated by acidification with hydrochloric acid. After filtering off with suction, washing with water and drying, there are obtained 57.5 g. (62% of theory) 3-acetyl-2,3,4,5-tetrahydro-1H-3-benzazepine-7-sulphonamide in the form of a colorless, finely crystalline powder; M.P. 180° C.

(b) 55.0 g. (0.205 mol) 3-acetyl-2,3,4,5-tetrahydro-1H-3-benzazepine-7-sulphonamide are stirred under reflux for eight hours in a mixture of 400 ml. of water and 160 ml. of concentrated hydrochloric acid. The solution is substantially concentrated, the resultant precipitate is filtered off with suction and recrystallized from water. 35.0 g. (65% of theory) 2,3,4,5-tetrahydro-1H-3-benzazepine-7-sulphonamide hydrochloride are obtained in the form of colorless crystals; M.P. 222° C.

(c) 30.2 g. (0.112 mol) 2,3,4,5-tetrahydro-1H-3-benzazepine-7-sulphonamide hydrochloride are suspended in 400 ml. pyridine, and 18.1 g. (0.124 mol) 5-methyl-isoxazole-3-carboxylic acid chloride are added portionwise at 0° C. to 10° C. while stirring. Stirring is continued at room temperature for 1 hour and at 60° C. for another hour, the mixture is cooled, part of the pyridine is drawn off, and the concentrated solution is poured into ice-water. The precipitate is filtered off with suction, washed with water, dissolved in a 2 N sodium hydroxide solution, the solution is filtered and acidified with hydrochloric acid. After filtering off with suction, washing with water and drying, 31.5 g. (84% of theory) 3-(5-methyl-isoxazole - 3 - carbonyl)-2,3,4,5-tetrahydro-1H-3-benzazepine-7-sulphonamide are obtained in the form of a colorless, finely crystalline powder; M.P. 192° C.

(d) 15.0 g. (0.045 mol) 3-(5-methyl-isoxazole-3-carbonyl)-2,3,4,5-tetrahydro-1H-3-benzazepine - 7 - sulphonamide are stirred in 200 ml. methyl ethyl ketone with 12.4 g. (0.09 mol) of powdered potassium carbonate under reflux for 30 minutes. 8.5 g. (0.068 mol) cyclohexyl-isocyanate are then added dropwise at 20° C. while stirring. The mixture is subsequently stirred at room temperature for 15 minutes and under reflux for two hours. After cooling, the mixture is suction-filtered, the residue dissolved in water, the solution clarified with active charcoal, and the filtrate acidified with hydrochloric acid. The precipitate is filtered off with suction, washed with water and recrystallized from isopropanol. The N-[3-(5-methyl-isoxazole-3-carbonyl)-2,3,4,5-tetrahydro - 1H-3 - benzazepine-7-sulphonyl]-N'-cyclohexyl-urea is obtained in the form of colorless crystals; M.P. 174° C.

EXAMPLE 2

(a) 5.6 g. (0.016 mol) 3-(5-methyl-isoxazole-3-carbonyl) - 2,3,4,5 - tetrahydro-1H-benzazepine-7-sulphonamide are stirred in 130 ml. methyl ethyl ketone with 4.5 g. (0.032 mol) of powdered potassium carbonate under reflux for 30 minutes; 2.4 g. (0.025 mol) chloroformic acid methyl ester are then added dropwise at room temperature. Stirring is continued at room temperature for 15 minutes and under reflux for a further 4 hours. After cooling, the mixture is suction-filtered, the precipitate dissolved in water, the solution is filtered and acidified with hydrochloric acid. The precipitate is filtered off with suction, washed with water and dried. 3.4 g. (57% of theory) N-[3-(5-methyl-isoxazole-3-carbonyl)-2,3,4,5-tetrahydro-1H-3-benzazepine - 7 - sulphonyl]-methyl urethane are obtained in the form of a colorless powder; M.P. 86° C.

(b) 3.4 g. (0.008 mol) N-[3-(5-methyl-isoxazole-3-carbonyl) - 2,3,4,5 - tetrahydro-1H-benzazepine-7-sulphonyl]-methyl-urethane are stirred under reflux in 40 ml. glycol dimethyl ether with 0.9 g. 0.008 mol) N-amino-hexamethylene-imine for two hours. After cooling, the solution is mixed with the same volume of ether. The precipitated product is filtered off with suction, washed with ether and dried. 2.6 g. (68% of theory) 4-[3-(5-methyl-isoxazole-3-carbonyl)-2,3,4,5-tetrahydro - 1H - 3-benzazepine-7-sulphonyl] - 1,1 - hexamethylene semicarbazide are obtained in the form of a colorless powder; M.P. 90° C.

EXAMPLE 3

From 2,3,4,5-tetrahydro-1H-3-benzazepine - 7 - sulphonamide hydrochloride and 1,5-dimethyl-pyrazole-3-carboxylic acid chloride (prepared from the corresponding carboxylic acid by heating with thionyl chloride), the 3-(1,5-dimethyl-pyrazole-3-carbonyl)-2,3,4,5-tetrahydro-1H-3-benzazepine-7-sulphonamide is obtained in analogy with Example 1(c) in the form of colorless crystals; M.P. 189° C.

From this compound and cyclohexyl-isocyanate, the N-[3 - (1,5 - dimethyl-pyrazole-3-carbonyl)-2,3,4,5-tetrahydro - 1H - 3 - benzazepine-7-sulphonyl]-N'-cyclohexyl-urea is obtained in analogy with Example 1(d) in the form of a colorless, finely crystalline powder; M.P. 110–112° C.

EXAMPLE 4

From 2,3,4,5-tetrahydro-1H-3-benzazepine - 7 - sulphonamide hydrochloride and 3-methyl-isothiazole-5-carboxylic acid chloride, the 3-(3-methyl-isothiazole-5-carbonyl)-2,3,4,5-tetrahydro-1H-3-benzazepine - 7 - sulphonamide is obtained in analogy with Example 1(c) in the form of colorless crystals; M.P. 190° C.

From this compound and cyclohexyl-isocyanate, the N-[3-(3 - methyl-isothiazole-5-carbonyl)-2,3,4,5-tetrahydro-1H-3-benzazepine-7-sulphonamide is obtained in analogy with Example 1(c) in the form of colorless crystals; M.P. 190° C.

From this compound and cyclohexyl-isocyanate, the N-[3 - (3-methyl-isothiazole-5-carbonyl)-2,3,4,5-tetrahydro-1H-3-benzazepine-7-sulphonyl]-N'-cyclohexyl-urea is obtained in analogy with Example 1(d) in the form of a colorless powder; M.P. 87° C.

EXAMPLE 5

From 2,3,4,5 - tetrahydro-1H-3-benzazepine-7-sulphonamide hydrochloride and 3-(2',6'-dichlorophenyl)-5-methyl-isoxazole-4-carboxylic acid chloride, the 3-[3-(2',6' - dichlorophenyl)-5-methyl-isoxazole-4-carbonyl]-2,3,4,5-tetrahydro-1H-3-benzazepine - 7 - sulphonamide is obtained in analogy with Example 1(c) in the form of a colorless powder; M.P. 98–100° C.

From this compound and chloroformic acid methyl ester, the N{3-[3-(2',6'-dichlorophenyl)-5-methyl-isoxazole - 4 - carbonyl]-2,3,4,5-tetrahydro-1H-3-benzazepine-7-sulphonyl}-methyl-urethane is obtained in analogy with Example 2(a) in the form of a colorless, finely crystalline powder of M.P. 138–140° C.; from this compound and N-amino-hexamethylene-imine, the 4-{3-[3-(2',6'-dichlorophenyl)-5-methyl-isoxazole - 4 - carbonyl]-2,3,4,5-tetrahydro-1H-3-benzazepine-7-sulphonyl} - 1,1 - hexamethylene-semicarbazide is obtained in analogy with Example 2(b) in the form of a colorless powder; M.P. 182–194° C.

EXAMPLE 6

In the manner described in Example 1(c), there is obtained from indoline-6-sulphonamide and 5-methyl-isoxazole-3-carboxylic acid chloride, the 1-(5-methyl-isoxazole-3-carbonyl)-indoline-6-sulphonamide in the form of colorless crystals of M.P. 198° C.; from this compound and cyclohexyl-isocyanate, the N[1-(5-methyl-isoxazole-3 - carbonyl)-indoline-6-sulphonyl]-N'-cyclohexyl-urea is obtained in analogy with Example 1(d) in the form of a colorless, finely crystalline powder; M.P. 197° C.

EXAMPLE 7

(a) In a manner similar to that described in Example 1(a), 1-acetyl-1,2,3,4-tetrahydro-quinoline is converted into 1 - acetyl-1,2,3,4-tetrahydro-isoquinoline-6-sulphonamide of M.P. 170–171° C. by the reaction with chlorosulphonic acid and subsequent reaction aqueous ammonia.

(b) 25.4 g. (0.1 mol) of this compound are heated at boiling temperature in 150 ml. of a 2 N sodium hydroxide solution for 2 hours. After cooling, the solution is filtered, acidified with 2 N acetic acid, the precipitate is filtered off with suction and recrystallized from methanol. 13.0 g. (61% of theory) 1,2,3,4-tetrahydro-quinoline-6-suphonamide are obtained in the form of a colorless, finely crystalline powder; M.P. 156° C.

(c) 10.6 g. (0.05 mol) 1,2,3,4-tetrahydro-quinoline-6-sulphonamide are dissolved in 100 ml. pyridine, and 8.0 g. (0.055 mol) 5-methyl-isoxazole-3-carboxylic acid chloride are added portionwise at 0–10° C. while stirring. Stirring is then continued at room temperature for one hour and at 60° C. for a further hour, the bulk of the pyridine is drawn off, and the residue is poured into ice-water. The precipitate is filtered off with suction, washed with water and recrystallized from acetone. 8.5 g. (53% of theory) 1-(5-methyl-isoxazole-3-carbonyl) - 1,2,3,4 - tetrahydro-quinoline-6-sulphonamide are obtained in the form of a colorless crystalline powder; M.P. 166° C.

(d) From the last-mentioned compound and cyclohexylisocyanate, the N-[1-(5-methyl-isoxazole-3-carbonyl)-1,2,3,4-tetrahydro-quinoline - 6 - sulphonyl]-N'-cyclohexyl-urea is obtained in analogy with Example 1(d) in the form of a colorless powder; M.P. 92–95° C.

EXAMPLE 8

If the reaction sequence of Example 1(a)–(c) is carried out, instead of with 3-acetyl-2,3,4,5-tetrahydro-1H-3-benzazepine, in an analogous manner with 2-acetyl-1,2,3,4-tetrahydro-isoquinoline, then there is obtained 2-(5-methyl-isoxazole -3 - carbonyl)-1,2,3,4-tetrahydro-isoquinoline-sulphonaomide of M.P. 150° C., in which the position of the sulphonamide group on the benzene ring is not determined. This compound can be reacted in analogy with Example 1(d) with cyclohexyl-isocyanate to form the corresponding N-[2-(5-methyl-isoxazole-3-carbonyl)-1,2,3,4 - tetrahydro-isoquinoline-sulphonyl]-N'-cyclohexyl-urea of M.P. 163° C.

EXAMPLE 9

By reacting 3-(5-methyl-isoxazole-3-carbonyl)-2,3,4,5-tetrahydro-1H-benzazepine-7-sulphonamide with butylisocyanate in analogy with Example 1(d), there is obtained N-[3 - (5 - methyl-isoxazole - 3 - carbonyl)-2,3,4,5-tetrahydro-1H-3-benzazepine-7-sulphonyl]-N'-butyl-urea; M.P. 173° C.

EXAMPLE 10

By reacting 2,3,4,5-tetrahydro-1H-3-benzazepine-7-sulphonamide and 3-methyl-isoxazole-5-carboxylic acid chloride in analogy with Example 1(c), there is obtained 3-(3-methylisoxazolog - 5 - carbonyl)-2,3,4,5-tetrahydro-1H-3-benzazepine-7-sulphonamide of M.P. 174° C.; from this compound and cyclohexylisocyanate, the N-[3-(3-methyl-isoxazole - 5 - carbonyl) - 2,3,4,5 - tetrahydro-1H-3-benzazepine-7-sulphonyl]-N'-cyclohexyl-urea is obtained in analogy with Example 1(d); M.P. 112° C.

The blood sugar depressing effect of the new compounds was determined on intact, fed rats by oral application in the form of a suspension in tragacanth slime and measuring of the blood sugar level according to Hoffmann, J. Biol. Chem. 120, 51 (1937). The figures are average values of six test animals per dose.

They are given in the following table.

The toxicity of these compounds is low. 2 g. per kg. body weight, administered per os, are tolerated by mice without any symptoms.

TABLE

| | Dose p.o., mg./kg. | Change of blood sugar as percent for control on intact, fed rats, hours after application— | |
|---|---|---|---|
| | | 1.5 | 3.0 |
| N-[3-(5-methylisoxazole-3-carbonyl)-2,3,4,5-tetrahydro-1H-3-benzazepine-7-sulphonyl]-N'-cyclohexylurea. | 0.1<br>1.0<br>10.0 | −16<br>−46<br>−59 | −14<br>−23<br>−28 |
| 4-[3-(5-methylisoxazole-3-carbonyl)-2,3,4,5-tetrahydro-1H-3-benzazepine-7-sulphonyl]-1,1-hexamethylenesemicarbazide | 0.1<br>1.0<br>10.0 | −25<br>−47<br>−56 | −16<br>−38<br>−48 |
| N-[3-(1,5-dimethylpyrazole-3-carbonyl)-2,3,4,5-tetrahydro-1H-3-benzazepine-7-sulphonyl]-N'-cyclohexylurea. | 0.1<br>1.0 | −6<br>−13 | −5<br>−3 |
| N-[3-(3-methylisothiazole-5-carbonyl)-2,3,4,5-tetrahydro-1H-3-benzazepine-7-sulphonyl]-N'-cyclohexylurea. | 0.1<br>1.0 | −2<br>−17 | −1<br>−6 |
| N-[1-(5-methylisoxazole-3-carbonyl)-indoline-6-sulphonyl]-N'-cyclohexylurea. | 0.01<br>0.1 | −9<br>−19 | −2<br>−17 |
| N-[3-(3-methylisoxazole-5-carbonyl)-2,3,4,5-tetrahydro-1H-3-benzazepine-7-sulphonyl]-N'-cyclohexylurea. | 0.1<br>1.0<br>10.0 | −18<br>−46<br>−53 | −7<br>−27<br>−43 |
| N-(4-methylbenzene-sulphonyl)-N'-butyl-urea(tolbutamide). | 5.0<br>10.0<br>60.0 | −6<br>−10<br>−42 | −5<br>−14<br>−11 |

It is to be appreciated that the compounds of the present invention can be combined with suitable pharmaceutically acceptable inert diluents and carriers in accordance with techniques and procedures which are per se known in the pharmaceutical field. Thus, the compounds of the present invention may be combined with pharmaceutically acceptable non-toxic inert diluents or carriers to form pharmaceutical compositions which may be administered to humans and such compositions may be in any of the forms which are conventionally used including but not limited to tablets, capsules, solutions, suspensions, emulsions, sterile solutions and the like, namely forms which are suitable for administration to humans.

What is claimed is:

1. A compound of the formula:

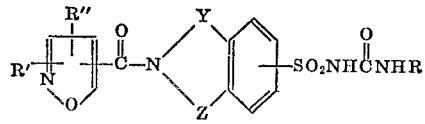

wherein R is a straight or branched chain alkyl of 1 to 10 carbon atoms, monocycloalkyl of 5 to 8 carbon atoms, said monocycloalkyl being unsubstituted or substituted by lower alkyl of 1 to 4 carbon atoms, or monocyclic amino selected from the group consisting of pyrrolidino, piperidino and hexamethylene imino, said monocyclic amino being unsubstituted or substituted by lower alkyl of 1 to 4 carbon atoms, the nitrogen atom of said monocyclic amino being linked to the adjacent NH group, R' and R" are hydrogen, halogen, alkyl of 1 to 8 carbon atoms, phenyl, or mono- or di-halophenyl, and Y and Z are alkylene of 1 to 3 carbon atoms, said alkylene being unsubstituted or substituted by lower alkyl of 1 to 4 carbon atoms, or one of Y or Z is a direct bond and the other of Y or Z is said unsubstituted or substituted alkylene containing 2 or 3 carbon atoms, or a pharmaceutically acceptable nontoxic salt thereof.

2. The compound according to claim 1, which is N-[3-(5-methyl-isoxazole-3-carbonyl) - 2,3,4,5 - tetrahydro-1H-3-benzazepine-7-sulphonyl]-N'-cyclohexyl-urea.

3. The compound according to claim 1, which is 4-[3-5-methyl-isoxazole - 3 - carbonyl)-2,3,4,5-tetrahydro-1H-3-benzazepine-7-sulphonyl] - 1,1 - hexamethylene semicarbazide.

4. The compound according to claim 1, which is 4-{3-[3-(2',6'-dichlorophenyl) - 5 - methyl-isoxazole - 4 - carbonyl] - 2,3,4,5 - tetrahydro - 1H - 3 - benzazepine-7-sulphonyl}-1,1-hexamethylene-semicarbazide.

5. The compound according to claim 1, which is N-[1-(5-methyl-isoxazole - 3 - carbonyl)-indoline - 6 - sulphonyl]-N'-cyclohexyl-urea.

6. The compound according to claim 1, which is N-[1-(5-methyl-isoxazole-3-carbonyl) - 1,2,3,4 - tetrahydroquinoline-6-sulphonyl]-N'-cyclohexyl-urea.

7. The compound according to claim 1, which is N-[2-(5-methyl-isoxazole - 3 - carbonyl)-1,2,3,4-tetrahydro-isoquinoline-sulphonyl]-N'-cyclohexyl-urea.

8. The compound according to claim 1, which is N-[3-(5-methyl-isoxazole-3-carbonyl) - 2,3,4,5 - tetrahydro-1H-3-benzazepine-7-sulphonyl]-N'-butyl-urea.

9. The compound according to claim 1, which is N-[3-(3-methyl-isoxazole - 5 - carbonyl)-2,3,4,5-tetrahydro-1H-3-benzazepine-7-sulphonyl]-N'-cyclohexyl-urea.

References Cited
FOREIGN PATENTS
1,176,310   1/1970   Great Britain.

ALEX MAZEL, Primary Examiner

R. V. RUSH, Assistant Examiner

U.S. Cl. X.R.

260—293.59, 293.61, 302 F, 302 H, 307 D, 307 H, 310 R; 424—258, 267, 270, 272, 273